UNITED STATES PATENT OFFICE.

SAMUEL J. PAYNE, OF CHARLTON, ENGLAND.

IMPROVEMENT IN PLASTIC COMPOUNDS FOR FURNACE-LINING, RETORTS, &c.

Specification forming part of Letters Patent No. 138,688, dated May 6, 1873; application filed April 9, 1873.

*To all whom it may concern:*

Be it known that I, SAMUEL J. PAYNE, of Charlton, county of Kent, England, have invented a certain Improvement in the Preparation of Plastic Compounds and in the Manufacture of Fire-Bricks, Crucibles, Retorts, and other fire-ware goods, whereby the destructive action of furnace-fires may be resisted, of which the following is a specification:

This invention relates, first, to the preparation of a plastic compound suitable for lining reverberatory furnaces and other furnaces which are subjected to an intense heat; and, secondly, to the manufacture of fire-bricks, crucibles, retorts, and other fire-ware goods, the object being to prepare a composition (whether used for the lining of furnaces or for the manufacture of such goods) which shall contain the largest available percentage of silica or silicious material, which material, as is well known, has the property of enabling the composition of which it forms a part to resist the destructive action of the furnace-fire.

In preparing a plastic composition for the lining of blast-furnaces and for the manufacture of fire-bricks and other articles according to this invention, I shall, in general, be guided by the locality in the selection of materials for forming the plastic compound; but where it is available I use, by preference, flint for my silicious material. The flint I calcine and break up into small pieces or into pieces that would pass freely through a sieve having a half-inch mesh. Of this material I take, say, eight parts and mix it in any suitable crushing or grinding mill with two parts of any suitable aluminous material, which acts as a binder to the flint. The aluminous materials may be Dorset blue clay ground and sifted.

In preparing a lining compound for puddling and other furnaces I add to these materials, when mixed in the proportions above named, about eight per cent., by weight, of calamine, (native carbonate of zinc,) for the purpose to be presently explained, and I effect the intimate admixture of the same with the silica and clay by means of the crushing-mill. When, however, I prepare a plastic compound for molding I prefer to omit the calamine from the mixture and use it in combination with the plastic compound in the manner to be presently described.

In the manufacture of fire-bricks, crucibles, and other fire-ware articles from a silicious compound prepared in or about the proportions above stated I use molds made of iron or other suitable material, using either hand-labor or machinery for effecting the molding operation. I should, however, state that in molding bricks I prefer to employ pressure for the consolidation of the brick.

Instead of using ordinary sand or its equivalent for preventing the adhesion of the plastic compound to the molds I mix with the sand or equivalent material which is to perform this office powdered calamine in the proportion of, say, one part of calamine to two of sand or its equivalent.

Before filling the molds with the plastic material I dust the molds with the above-mentioned mixture after the ordinary manner of dusting molds. I then introduce into the mold the plastic compound and dust it over with the mixture of sand or its equivalent and calamine. The effect of this dusting will be to coat the surface of the molded brick on all sides with the calamine, which will adhere thereto. On subjecting the brick thus coated to the heat of the kiln the calamine will be fused, and, acting as a flux on the whole surface of the brick, a toughness will be imparted to the exterior of the brick, giving to it an amount of strength far greater than that which is due to the small percentage of binding-clay employed in its manufacture.

The structural strength thus attainable from the surface action of the calamine present on the exterior of the green brick enables me to uphold in the molded brick while being fused the large percentage of silicious material above indicated, and thereby to produce a brick that will resist in a most efficient manner the destructive action of a furnace-fire. This remark applies equally to the furnace-lining composition first described, the continuous action of the fire upon which will cause the silex gradually to diffuse itself throughout the mass and thereby enable the lining to resist the action of the fire.

The manufacture of crucibles, retorts, and fire-ware goods other than bricks will be similar to the manufacture of bricks, a coating of calamine being applied to them, as above explained. In this case also, in the firing of the goods, a toughness will be imparted to the exterior of the molded article which will give structural strength thereto, and thus the friable tendency of the composition will, to a considerable extent, be neutralized.

From the foregoing it will be understood that the plastic compound, whether molded or not, will, by reason of the application of the calamine thereto, either in the body thereof or on its surface, become gradually more homogeneous on exposure to a white heat in a reverberatory or other furnace by reason of the silex slowly fusing under the intense heat and diffusing itself throughout the mass.

Having now set forth the nature of my invention and explained the manner of carrying the same into effect, I wish it to be understood that I claim—

1. A plastic composition consisting of silicious and aluminous materials combined with calamine, in or about the proportions above set forth.

2. The application of calamine to the external surfaces of molded articles composed of a plastic compound of silicious and aluminous materials, in the manner and for the purpose above set forth.

SAMUEL JONES PAYNE.

Witnesses:
   H. K. WHITE,
      66 *Chancery Lane, London.*
   G. W. WESTLEY,
      24 *Royal Exchange, London.*